United States Patent [19]

Ando

[11] Patent Number: 5,784,605
[45] Date of Patent: Jul. 21, 1998

[54] METHOD FOR PROCESSING BRANCH INSTRUCTIONS BETWEEN COMPUTER PROGRAM MODULES

[75] Inventor: Yoshinari Ando, Tokyo, Japan

[73] Assignee: NEC Corporation, Tokyo, Japan

[21] Appl. No.: 599,127

[22] Filed: Feb. 9, 1996

[30] Foreign Application Priority Data

Feb. 21, 1995 [JP] Japan ................................ 7-032487

[51] Int. Cl.$^6$ ................................................ G06F 9/42
[52] U.S. Cl. ................................................ 395/585
[58] Field of Search ................. 364/DIG. 1 MS File, 364/DIG. 2 MS File; 395/376, 381, 561, 570, 580, 581, 584, 585

[56] References Cited

U.S. PATENT DOCUMENTS 4,449,185  5/1984  Oberman et al. ................. 395/581

*Primary Examiner*—Robert B. Harrell
*Attorney, Agent, or Firm*—Young & Thompson

[57] ABSTRACT

The present invention provides a novel method for processing short branch instructions for branches between program modules into which a computer program is divided. The method comprises the following steps. It is verified that a branching location for a short branch instruction is outside a branch-enable bound that a branch can be made in accordance with the short branch instruction, wherein the branching location is a location to which the branch is about to be made in accordance with the short branch instruction. Any empty region is searched in the branch-enable bound. A long branch instruction is generated on the empty region. The branching location is amended into an address to which the branch will be made in accordance with the long branch instruction.

6 Claims, 4 Drawing Sheets

METHOD FOR PROCESSING BRANCH INSTRUCTIONS BETWEEN COMPUTER PROGRAM MODULES

BACKGROUND OF THE INVENTION

The present invention relates to a method for processing branch instructions, and more particularly to a method for processing branch instructions between modules of computer programs.

Computer programs may often be branched to a plurality of program modules, wherein branches or jumps from one module to another module are often required. The branches or jumps are made in accordance with branch instructions. Each of the branch instructions comprises a code having a predetermined length. The length of each of the branch instruction codes is determined in assembly. In the prior art, the branch instructions are normally replaced by long branch instructions having maximum code lengths. An address is determined for a link of the replaced branch instructions. The replaced long branch instructions may, however, often be a jump to a new module located within a bound that a short branch instruction having a short code length can jump. In this case, the short branch instruction is sufficient for branch. In the prior art, however, there is no function to change the long branch instruction to the short branch instruction. For this reason, the long branch instruction remains unchanged to the short branch instruction. This leads to redundancy of the program codes.

In the Japanese laid-open patent application No. 62-205431, a branch instruction processing system is proposed for solving the problem with the redundancy of the program codes. In assembly, the branch instructions between modules are replaced by presumptive branch instructions. For a presumptive branch instruction and a new module to which the current module is jumped according to the presumptive branch instruction, there are required information about description locations within the new module. These description location information are given as relative addresses from the top and the end of the new module. The relative addresses are stored in a table which is outputted on an object file. A code size of the entire part of the module is also stored in the table. When the above relative address and the code size of the entire part of the module are determined, the code length of the presumptive branch instruction is counted as a code length of the long branch instruction.

In link process, input modules are linked. For all the presumptive branch instructions, relative addresses of the presumptive branch instruction and the branching location to which the module jumps are found with reference to information on the table in the object file so that it will be judged whether the found relative addresses are within the bound to which the module can jump according to the short branch order. If the branching location to which the current module will jump is outside the bound, then the presumptive branch instruction is replaced by the long branch instruction. If, however, the branching location is within the bound, then the presumptive branch instruction is replaced by the short branch instruction and the code length is changed. For this reason, the address previously determined before the change of the presumptive branch instruction to the short branch instruction is different from the address to be referred after the change of the presumptive branch instruction to the short branch instruction. To compensate this difference of the address, amendments to the information about the locations are made. The above processes are repeated until all of the presumptive branch instructions are replaced by either the long or short branch instructions. An amendment to the address is made since the code length of the branch instruction is changed. The above processes are made to prevent the redundancy of the code length.

The above branch instruction processing method is advantageous in setting the suitable code lengths of the branch instructions between modules. It is, however, required that, after the presumptive branch instruction is replaced by the long or short branch instruction, the amendment to the address is made with reference to the relocated address information since the code length of the branch instruction is changed. This amendment processing increases the load to the link processing. This may deteriorate the performance of the linker and also leads to inefficient debugging of the user's program.

SUMMARY OF THE INVENTION

Accordingly, it is an object of the present invention to provide a novel method for processing branch instructions free from the problems described above.

The above and other objects, features and advantages of the present invention will be apparent from the following descriptions.

The present invention provides a novel method for processing short branch instructions for branches between program modules into which a computer program is divided. The method comprises the following steps. It is verified that a branching location for a short branch instruction is outside a branch-enable bound that a branch can be made in accordance with the short branch instruction, wherein the branching location is a location to which the branch is about to be made in accordance with the short branch instruction. Any empty region is searched in the branch-enable bound. A long branch instruction is generated on the empty region. The branching location is amended into an address to which the branch will be made in accordance with the long branch instruction.

As described above, in the link processing according to the present invention, if the branching location to which the branch should be made in accordance with the inter-module branch instruction is within the short branch enable bound that the branch can be made by the short branch instruction, then a long branch instruction is generated on an empty region so that any address correction processing program code location processing is never required. For this reason, it is possible to execute the inter-module branch instruction processing without any deterioration of the link processing performance.

BRIEF DESCRIPTIONS OF THE DRAWINGS

Preferred embodiments of the present invention will be described in detail with reference to the accompanying drawings.

DISCLOSURE OF THE INVENTION

The present invention provides a novel method for processing short branch instructions for branches between program modules into which a computer program is divided. The method comprises the following steps. It is verified that a branching location for a short branch instruction is outside a branch-enable bound that a branch can be made in accordance with the short branch instruction, wherein the branching location is a location to which the branch is about to be made in accordance with the short branch instruction. Any empty region is searched in the branch-enable bound. A long branch instruction is generated on the empty region. The branching location is amended into an address to which the branch will be made in accordance with the long branch instruction.

The above steps are repeatedly executed for all of the short branch instructions.

The above verifying step may further comprises the steps of finding a distance between the short branch instruction and the branching location, and verifying that the distance is beyond a maximum distance within which the branch can be made in accordance with the short branch instruction. In this case, the above distance may be found from a relative address between the short branch instruction and the branching location.

It is available to further amend an object code of the short branch instruction to match the long branch instruction. It is also available to furthermore output a load module file in which instructions are transformed into machine languages operable on a microcomputer.

As described above, in the link processing according to the present invention, if the branching location to which the branch should be made in accordance with the inter-module branch instruction is within the short branch enable bound that the branch can be made by the short branch instruction, then a long branch instruction is generated on an empty region so that any address correction processing program code location processing is never required. For this reason, it is possible to execute the inter-module branch instruction processing without any deterioration of the link processing performance.

The above present invention can be applicable to a processor wherein program memories are discontinuous, since empty regions may be generated at the ends of the program memories for the inter-module branch instructions in order to ignore the redundancy codes of the entire part of the program. This can curtail the time necessary for link processing and the time for debugging the programs.

A first embodiment according to the present invention will be described in detail with reference to the accompanying drawings.

Figure 1:
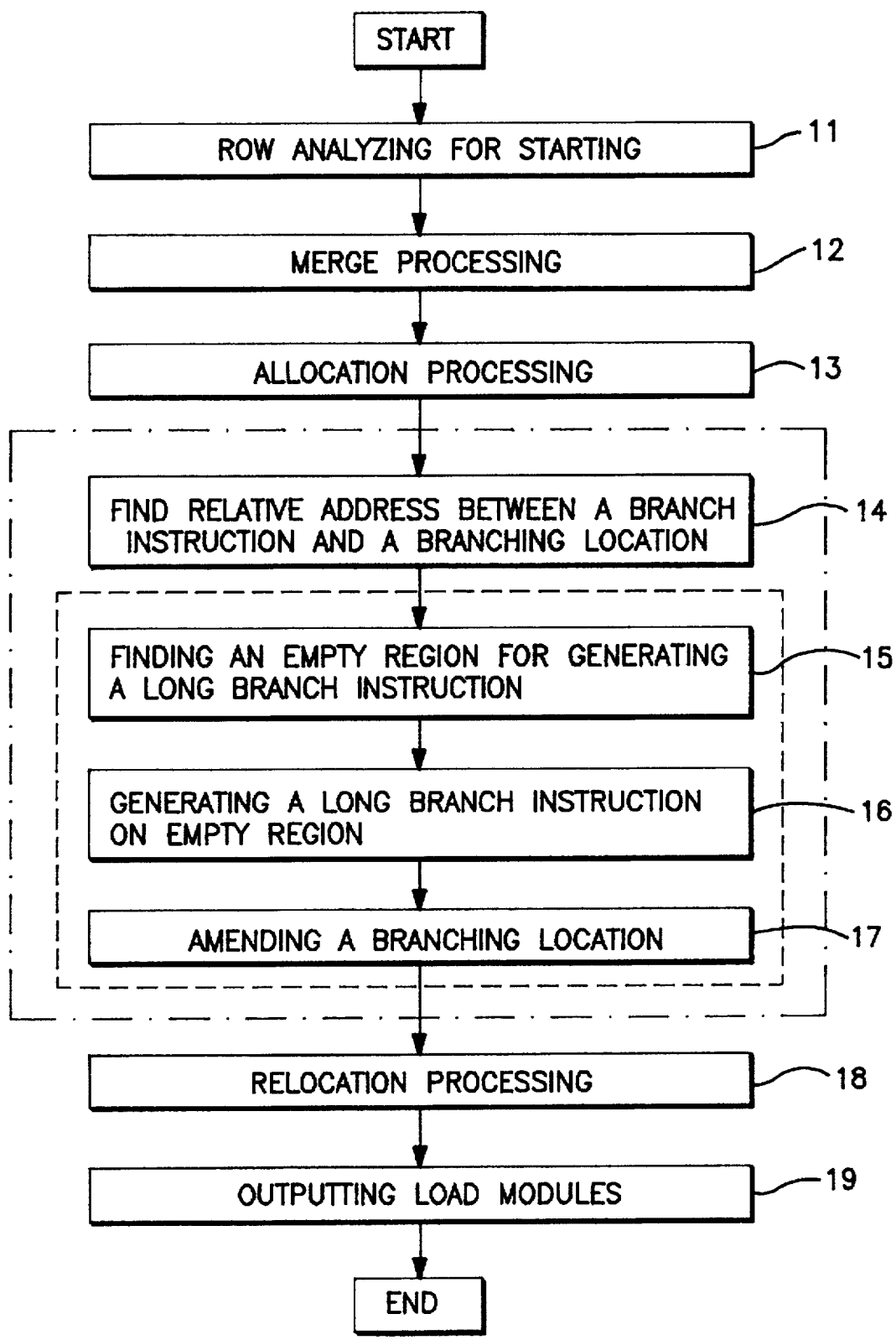
FIG. 1 is a flow chart illustrative of a novel branch instruction processing in a first embodiment according to the present invention.

With reference to FIG. 1, a novel branch instruction processing according to the present invention will be described hereafter. The novel branch instruction processing comprises first to ninth steps S11 to S19.

In the first step S11, a row analyzing processing is executed for starting a branch processing which execute a branch from one program module to another program module, wherein programs are divided into a plurality of program modules.

In the second step S12, a merge processing is executed for linking location units in a linker for each of the location units In the third step S13, an allocation processing is executed for determining a location address for each of the location units.

In the fourth step S14, relative addresses are found, which are of branch instructions and branching locations at which there exists a new module to which the current module is branched or jumped. If the relative addresses found are outside a bound that the branch is possible, the processing enters into the fifth step S15. If, however, the relative addresses found are within the bound, the processing enters into the eighth step S18.

In the fifth step S15, sequential searches from the low-order address are executed to confirm whether there exists any empty region for generating a long branch instruction in order to execute a branch processing. If no empty region is founded, then a predetermined error processing is executed. If any empty region is founded, then the processing enters into the sixth step S16.

In the sixth step S16, the long branch instruction is generated at the empty region. Further, the original branching location to which the branch should have been made is changed to a new branching location to which the generated long branch can be made.

In the seventh step S17, the original branching location is changed to the address of the long branch instruction generated. Information to be used for relocation of the original branch instruction is also amended.

In the eighth step S18, a relocation processing is executed for amendment to an object code of the original branch instruction since the address to which the branch should have been made is changed.

In the ninth step S19, a load module file is outputted wherein instructions are transfonned into machine languages operable on the microcomputer thereby the branching processing is completed.

Figure 2:
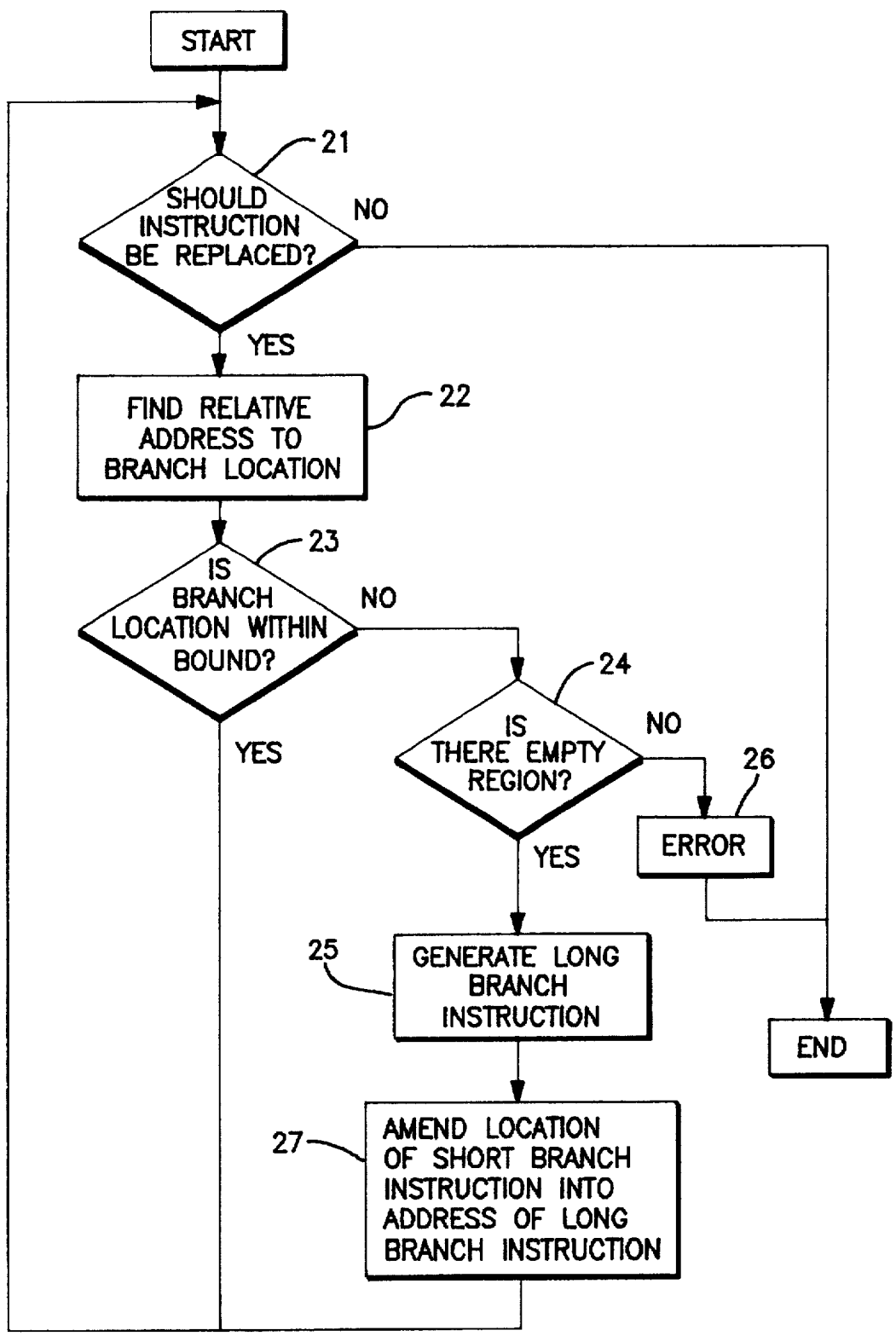
FIG. 2 is a flow chart illustrative of a novel link processing in a first embodiment according to the present invention.

Link processing will hereinafter be described with reference to FIG. 2. The link processing is to be executed after the relocation processing has been executed for input file code. The link processing is the processing to be executed in association with the above fourth, fifth and sixth steps S14, S15 and S16. The link processing comprises the steps S21 to S27.

In the step S21, it is verified whether an instruction replacement processing is required for the short branch instruction. If the above instruction replacement processing is required, then the processing enters into the step S22. If, however, the above instruction replacement processing is not required, the processing ends.

In the step S22, there are found relative addresses of the short branch instructions and the branching locations to which the branch should be made.

In the step S23, it is verified whether the above branching location is within a bound that the branch can be made. If the above branching location is within the bound that the branch can be made, then the processing backs to the above step S21. If, however, the above branching location is outside the bound that the branch can be made, then the processing enters into the step S24.

In the step S24, it is verified whether there exists any empty region for generating a long branch instruction in the bound that the branch can be made. If there exists any empty region, then the processing enters into the step S25. If, however, no empty region exists in the bound that the branch can be made, then the processing enters into the step S26 in which error processing is executed.

In the step S25, a long branch instruction is generated on the empty region for the branching location of the above short branch instruction and then the processing enters into the step S27.

In the step S27, the original short branching location to which the branch should have been made in accordance with the original short branch instruction is amended to a new address to which the branch will be made in accordance with the generated long branch instruction. Subsequently, the processing backs to the above step S21.

The above steps S21 to the S27 are executed for all of the short branch instructions.

Figure 3:
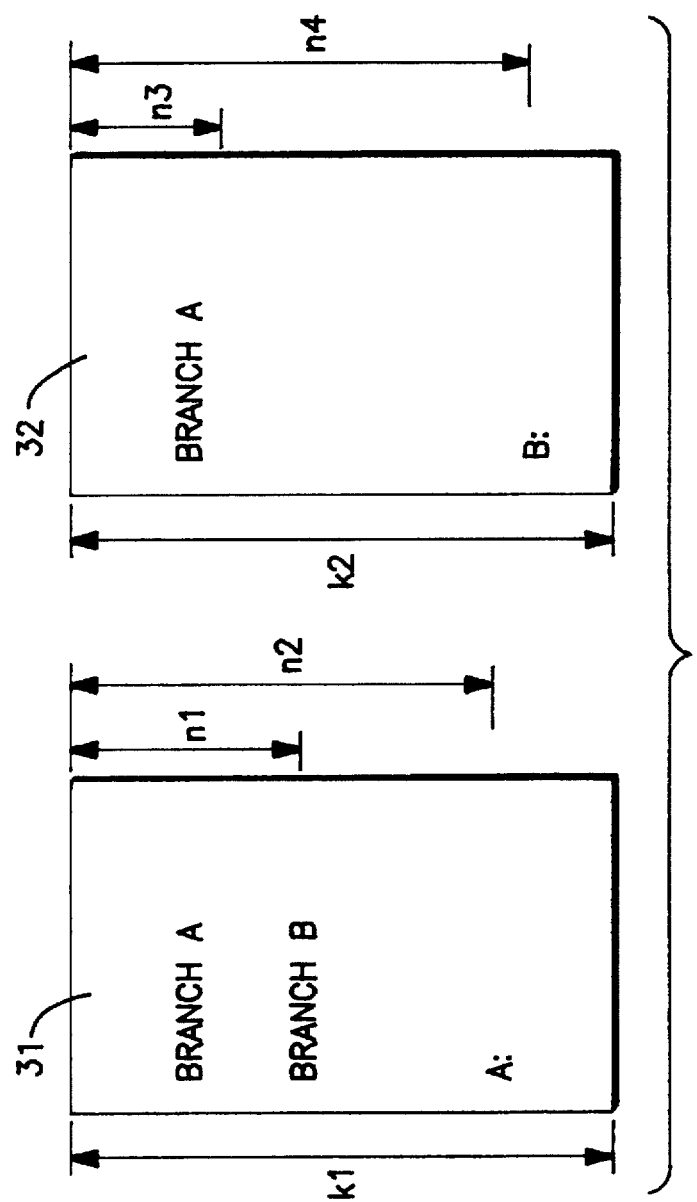
FIG. 3 is a diagram illustrative of an example of computer programs to which a novel branch instruction processing in a first embodiment according to the present invention is applied.

The above processing will be flirther described with reference to FIG. 3 which illustrates two program modules 31 and 32 into which a computer program is divided. In the module 31, there exist an in-module branch instruction "BRANCH A", an inter-module branch instruction "BRANCH B" for a branch location label "B" in the module 32 and a branch location label "A". In the module 32, there exist an inter-module branch instruction "BRANCH A" for the branch location label "A" in the module 31 and the branch location label "B".

In assembly for the module 31, the code length of the in-module branch instruction "BRANCH A" is determined since there has been confirmed relative address of the in-module branch instruction "BRANCH A" and the branch location label "A". The inter-module branch instruction "BRANCH B" is replaced by a short branch instruction "S-BRANCH B" since there has not yet been confirmed any relative address of the inter-module branch instruction "BRANCH B" and the branch location label "B". A relative address (n1) specified from the head of the module 31 is stored in the object file together with the branch location label "B". For the branch location label "A", a relative address (n2) specified from the head of the module 31 is stored in the object file. In conclusion, a code size of the entire part of the module 31 is stored in the object file.

For the module 32, the inter-module branch instruction "BRANCH A" is replaced by a short branch instruction "S-BRANCH B". A relative address (n3) specified from the head of the module 32 is stored in the object file. For the branch location label "B", a relative address (n4) specified from the head of the module 32 is stored in the object file. In conclusion, a code size of the entire part of the module 32 is stored in the object file.

Figure 4:
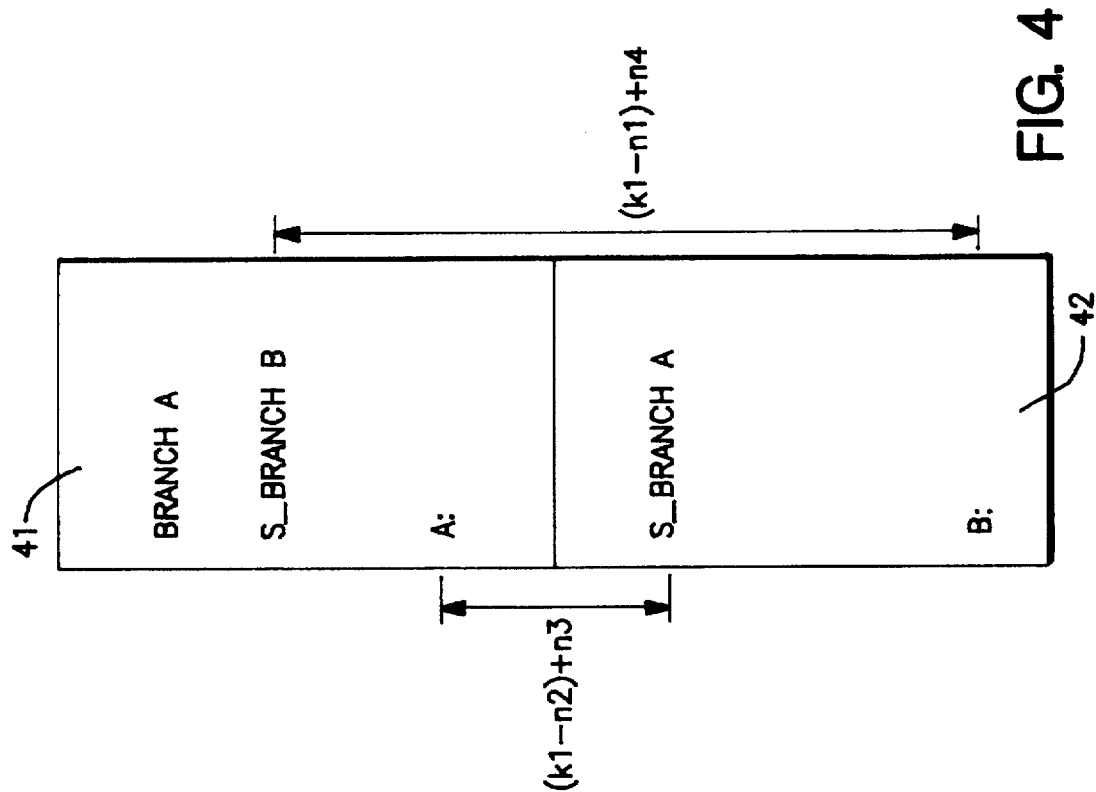
FIG. 4 is a diagram illustrative of an example of computer programs to which a novel link processing in a first embodiment according to the present invention is applied.

FIG. 4 illustrates program modules 41 and 42 already linked and how to compulte relative address of the short branch instruction "S-BRANCH B" and the branch location. An address (k1−n1)+n4 is the relative address of the branch location label "B" in the module 42 and the short branch instruction "S-BRANCH B" in the module 41. An address (k1−n2)+n3 is the relative address of the branch location label "A" in the module 41 and the short branch instruction "S-BRANCH A" in the module 42. The bound that the branch is made possible by the short branch instruction, namely the maximum jumping distance of the short branch instruction, is assumed as (S-BR-MAX). If the following conditions are satisfied, this means the blanch location to which the branch should be made by the short branch instruction "S-BRANCH B" is within the bound that the branch is made possible by the short branch instruction.

(k1−n1)+n4>(S-BR-MAX)

(k1−n2)+n3<(S-BR-MAX)

Figure 5:
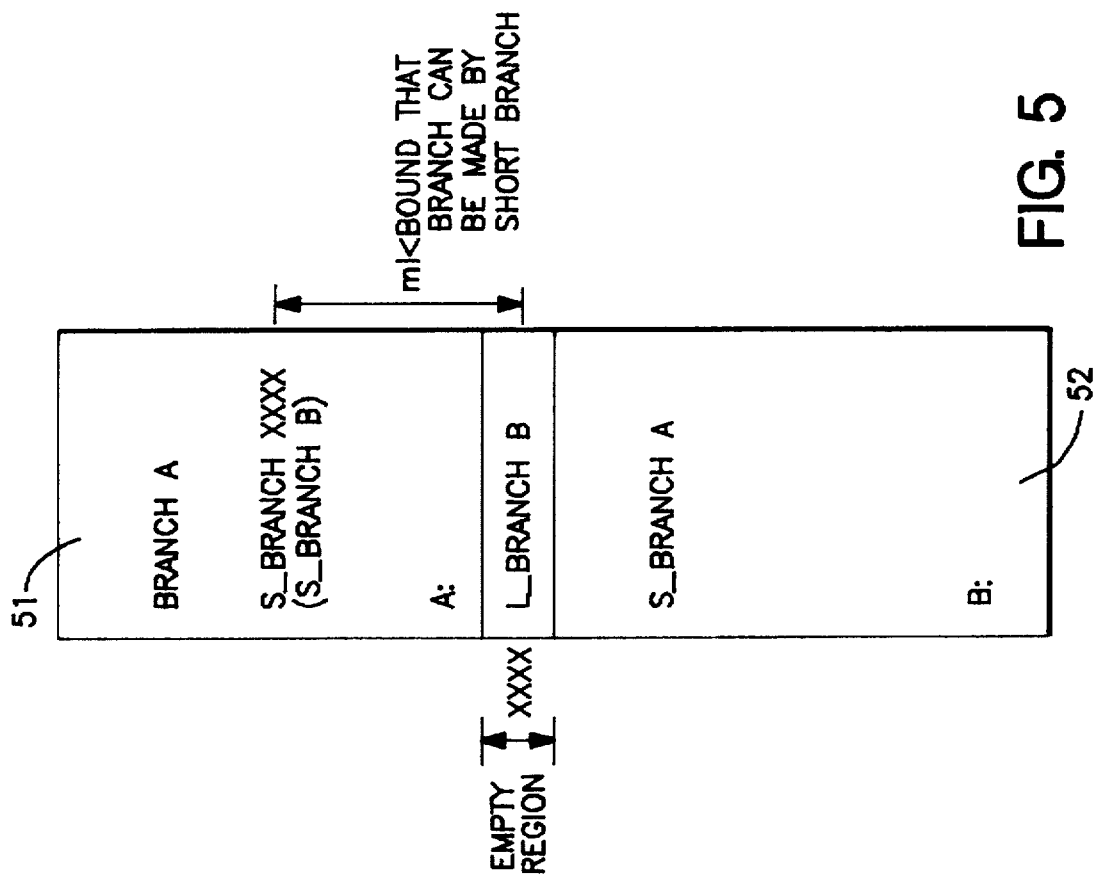
FIG. 5 is a diagram illustrative of an example of computer programs to which a novel link processing in a first embodiment according to the present invention is applied.

In case of the above, no long branch instruction is generated in the link processing since the branch location of the short branch instruction "S-BRANCH A" is within the bound that the branch is made possible by the short branch instruction. On the other hand, the branch location of the short branch instruction "S-BRANCH B" is outside the bound that the branch is made possible by the short branch instruction. For this reason, any empty region is searched for generating a long branch instruction "L-BRANCH B" within a branch-enable bound m1 that the branch can be made by the short branch instruction. As illustrated in FIG. 5, the long branch instruction "L-BRANCH B" is generated on an empty region between program modules 51 and 52. The branch location of the original short branch instruction is amended to a new address "XXXX" of the generated long branch instruction "L-BRANCH B". Since the branch location of the original short branch instruction is amended to the address "XXXX" of the generated long branch instruction "L-BRANCH B", amendments are made to information to be used for relocation processing of the short branch instruction.

As described above, in the link processing according to the present invention, if the branching location to which the branch should be made in accordance with the inter-module branch instruction is within the short branch enable bound that the branch can be made by the short branch instruction, then a long branch instruction is generated on an empty region so that any address correction processing program code location processing is never required. For this reason, it is possible to execute the inter-module branch instruction processing without any deterioration of the link processing performance.

The above present invention can be applicable to a processor wherein program memories are discontinuous since empty regions may be generated at the ends of the program memories for the inter-module branch instructions in order to inore the redundancy codes of the entire part of the program. This can curtail the time necessary for link processing and the time for debugging the programs.

Whereas modifications of the present invention will be apparent to a person having ordinary skill in the art, to which the invention pertains, it is to be understood that embodiments shown and described by way of illustrations are by no means intended to be considered in a limiting sense. Accordingly, it is to be intended to cover by claims all modifications which fall within the spirit and scope of the invention.

What is claimed is:

1. A method for processing short branch instructions for branches between program modules into which a computer program is divided, said method comprising the steps of:

verfying that a branching location for a short branch instruction is outside a branch-enable bound that a branch can be made in accordance with said short branch instruiction, wherein said branching location is a location to which said branch is about to be made in accordance with said short branch instruction;

searching an empty region in said branch-enable bound;

generating a long branch instruction on said empty region; and amending said branching location into an address to which said branch will be made in accordance with said long branch instruction.

2. The method as claimed in claim 1, wherein said verifying step further comprises the steps of:

finding a distance between said short branch instruction and said branching location; and verifying that said distance is beyond a maximum distance within which said branch can be made in accordance with said short branch instruction.

3. The method as claimed in claim 2, wherein said distance is found from a relative address between said short branch instruction and said branching location.

4. The method as claimed in claim 1, further comprising the step of amending an object code of said short branch instruction to match said long branch instruction.

5. The method as claimed in claim 4, further comprising the step of outputting a load module file in which instructions are transformed into machine languages operable on a microcomputer.

6. The method as claimed in claim 1, wherein said first to fourth steps are repeatedly executed for all of said short branch instructions.

* * * * *